United States Patent
Yuki

(10) Patent No.: US 8,861,093 B2
(45) Date of Patent: Oct. 14, 2014

(54) ZOOM LENS AND IMAGE PICKUP APPARATUS EQUIPPED WITH THE SAME

(71) Applicant: Canon Kabushiki Kaisha, Tokyo (JP)

(72) Inventor: Akihiko Yuki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/749,141

(22) Filed: Jan. 24, 2013

(65) Prior Publication Data

US 2013/0194679 A1  Aug. 1, 2013

(30) Foreign Application Priority Data

Jan. 30, 2012  (JP) ................. 2012-016351

(51) Int. Cl.
*G02B 15/14* (2006.01)
*G02B 15/177* (2006.01)

(52) U.S. Cl.
CPC .............. *G02B 15/14* (2013.01); *G02B 15/177* (2013.01)
USPC ........................................ 359/689; 359/676

(58) Field of Classification Search
USPC .................. 359/676–706, 822–826
See application file for complete search history.

(56) References Cited

U.S. PATENT DOCUMENTS

2010/0214665 A1  8/2010  Hatakeyama
2012/0162776 A1*  6/2012  Nanba ........................ 359/682

FOREIGN PATENT DOCUMENTS

JP  2011-064933 A  3/2011

* cited by examiner

*Primary Examiner* — Mahidere Sahle
(74) *Attorney, Agent, or Firm* — Canon USA Inc IP Division

(57) ABSTRACT

A zoom lens includes, in order from an object side to an image side, a first lens unit having negative refractive power, a second lens unit having positive refractive power, and a third lens unit having positive refractive power. A distance between every adjacent ones of the first to third lens units varies during zooming. The second lens unit includes, in order from the object side to the image side, a positive lens and a cemented lens in which a positive lens and a negative lens are cemented. A focal length (f2) of the second lens unit, a focal length (fT) of the entire zoom lens at a telephoto end, and an average refractive index (Npave) of materials of the positive lenses included in the entire zoom lens are appropriately set.

9 Claims, 17 Drawing Sheets

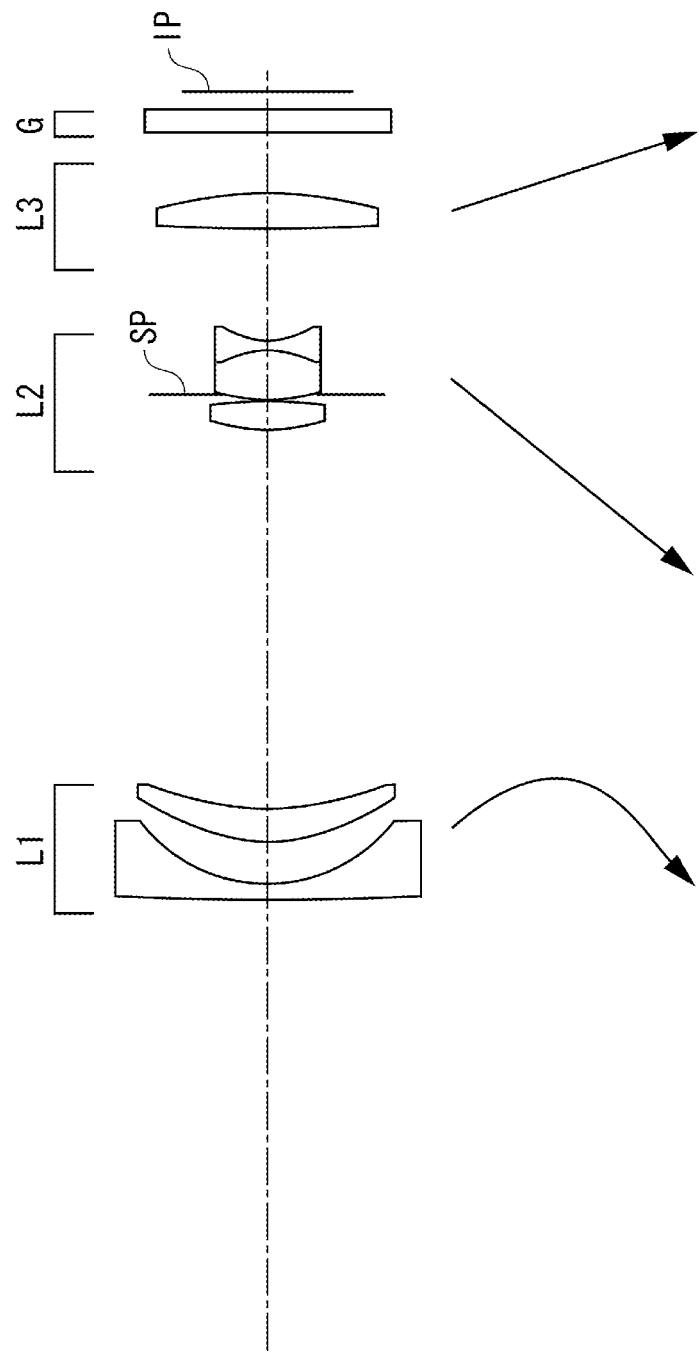

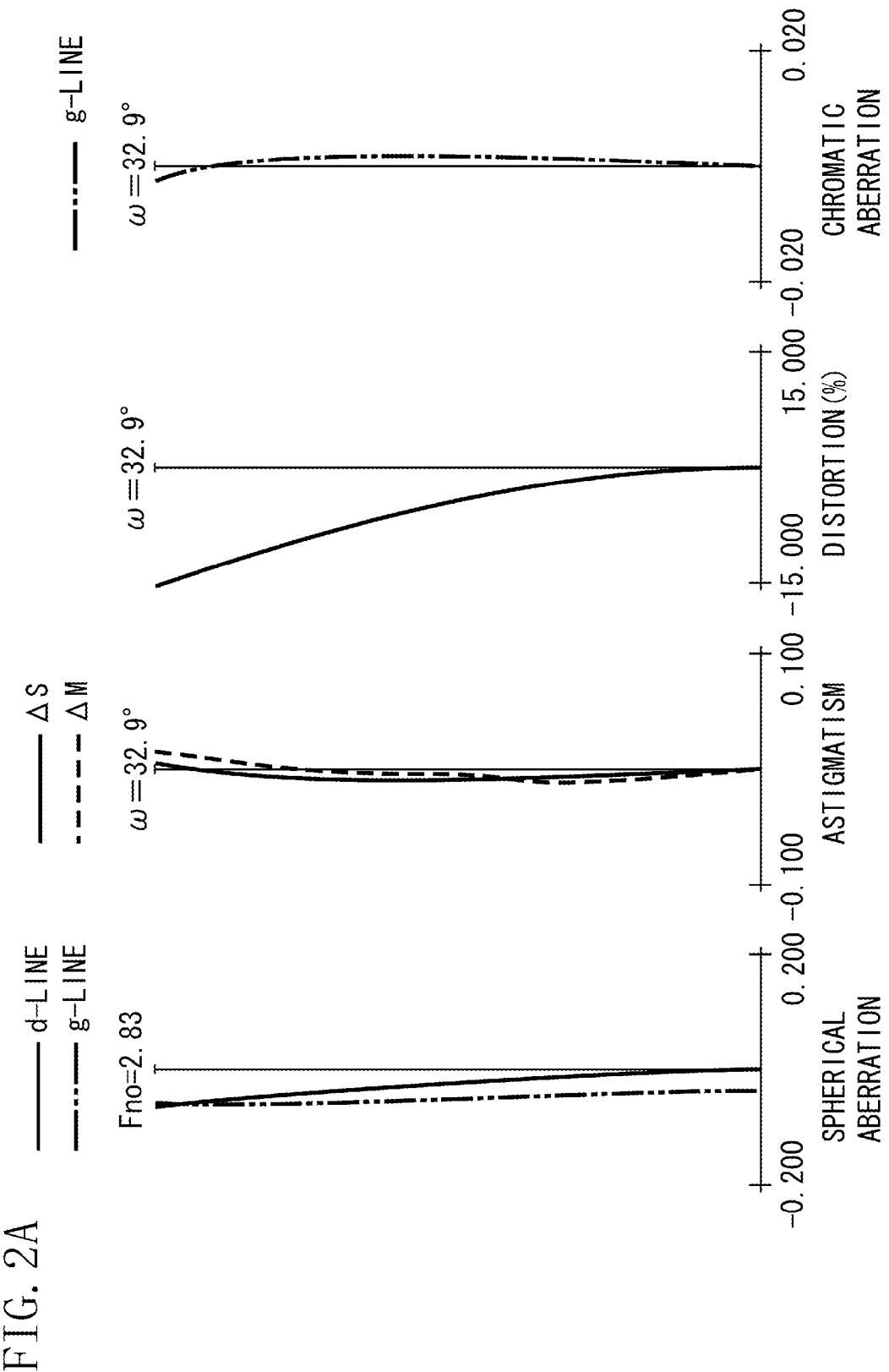

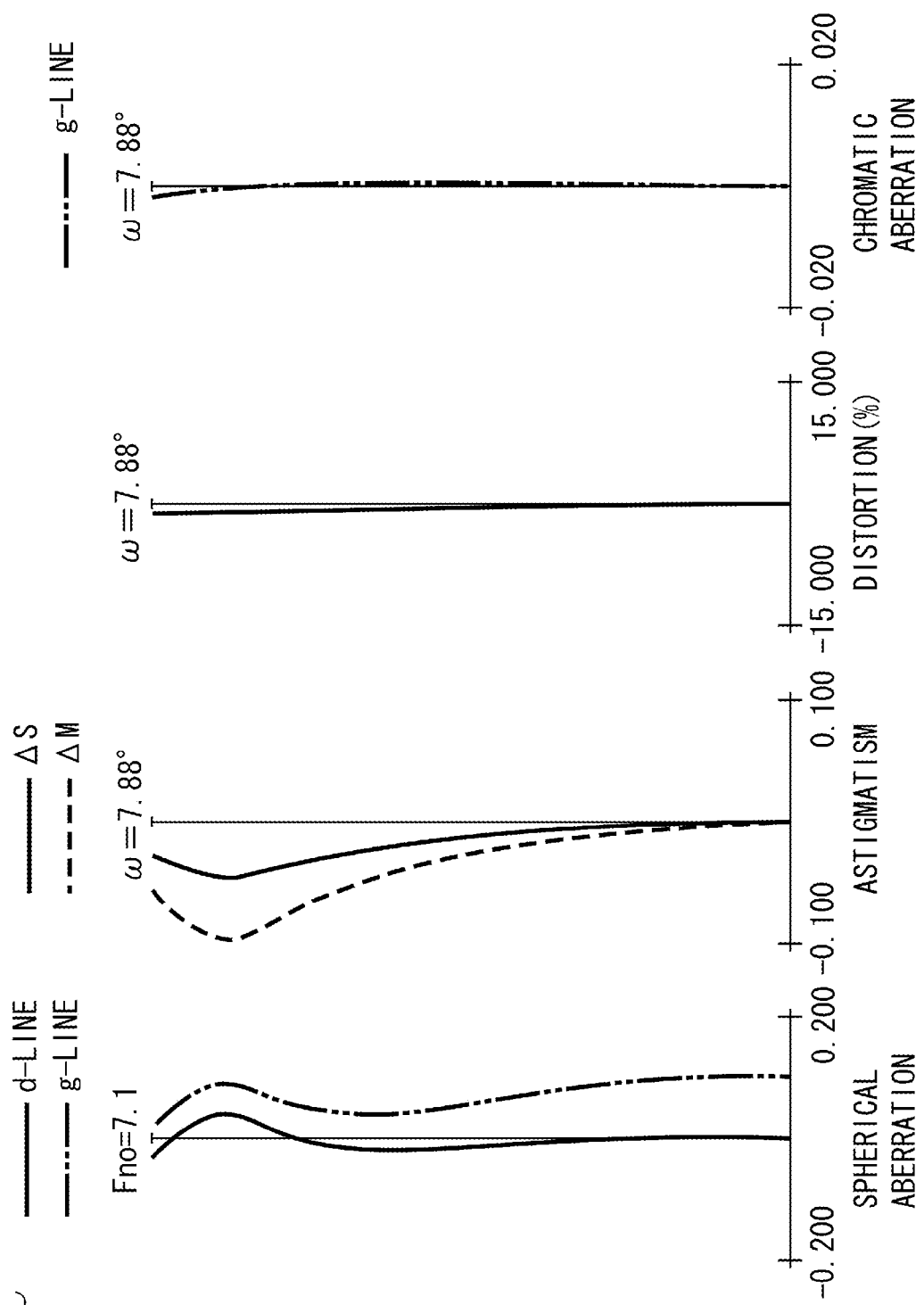

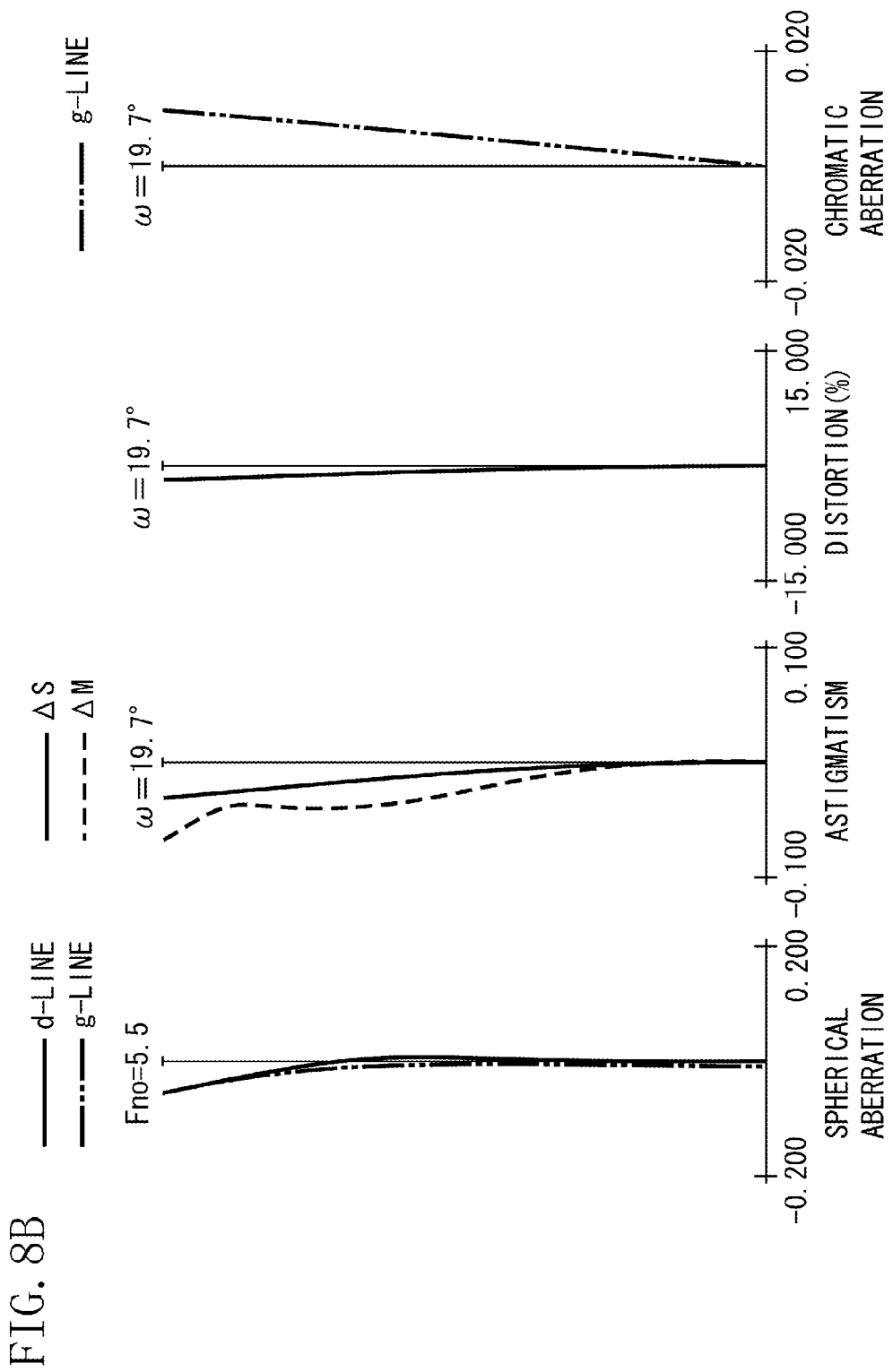

ZOOM LENS AND IMAGE PICKUP APPARATUS EQUIPPED WITH THE SAME

BACKGROUND OF THE INVENTION

1. Field of the Invention

The present invention relates to a zoom lens that is suitable as a photographic optical system of an image pickup apparatus, such as a digital still camera, a video camera, a TV camera, and a monitoring camera.

2. Description of the Related Art

As a photographing optical system used for an image pickup apparatus, there is required a zoom lens that has a short total lens length, a small size, a wide angle of view, a high zoom ratio, and a high resolution.

As a compact zoom lens having a wide angle of view and a high zoom ratio, a negative-lead type zoom lens is known. In the negative-lead type zoom lens, a lens unit having negative refractive power is located closest to an object side.

As a negative-lead type zoom lens, a three-unit zoom lens is known. The three-unit zoom lens includes, in order from an object side to an image side, a first lens unit having negative refractive power, a second lens unit having positive refractive power, and a third lens unit having positive refractive power. There is known a compact three-unit zoom lens having a wide angle of view, in which a first lens unit includes a negative lens and a positive lens, a second lens unit includes three lenses, and a third lens unit includes a single positive lens.

Japanese Patent Application Laid-Open No. 2011-064933 discusses a compact zoom lens in which a focal length equivalent to a silver-halide camera is 29 mm and a zoom ratio is about 4.7 times. U.S. Patent Application Publication No. 2010/0214665 discusses a compact zoom lens in which a focal length equivalent to a silver-halide camera is 26 mm and a zoom ratio is about 3.8 times.

In the negative-lead type three-unit zoom lens, it is effective to shorten a focal length of, for example, a second lens unit that manages a main variable magnification to downsize the entire zoom lens and achieve a high zoom ratio. However, if the focal length is simply shortened, Petzval sum is increased. Therefore, it is difficult to realize a characteristic of a flat image plane over the entire zoom range. It is effective for suppressing an increase in Petzval sum to share positive refractive power with a plurality of positive lens, or use a high-refractive-index material for a positive lens.

In each exemplary embodiment of Japanese Patent Application Laid-Open No. 2011-064933, an average refractive index of materials of positive lenses included in the entire zoom lens is about 1.71. In each exemplary embodiment of U.S. Patent Application Publication No. 2010/0214665, an average refractive index of materials of positive lenses included in the entire zoom lens is about 1.74. In these lens configurations, if a high zoom ratio and downsizing of the entire zoom lens are intended to be achieved by shortening a focal length of a second lens unit, curvature of field increases over the entire zoom range, and it is difficult to realize a characteristic of a flat image plane.

For reducing the curvature of field in the entire zoom range while achieving downsizing of the entire zoom lens and high zoom ratio, it is important to appropriately set a lens configuration of each lens unit constituting the zoom lens, or refractive power of each lens unit. For example, it is important to appropriately set refractive power of a second lens unit, or a material of a positive lens included in the entire zoom lens. If the setting is inappropriate, it is very difficult to obtain high optical performance while achieving downsizing of the entire zoom lens, a wide angle of view, and a high zoom ratio.

SUMMARY OF THE INVENTION

An embodiment of the present invention is directed to a zoom lens, which is compact, has a high zoom ratio, and can obtain high optical performance over the entire zoom range, and an image pickup apparatus including the zoom lens.

According to an aspect of the present invention, a zoom lens includes, in order from an object side to an image side, a first lens unit having negative refractive power, a second lens unit having positive refractive power, and a third lens unit having positive refractive power, wherein a distance between every adjacent ones of the first to third lens units varies during zooming, wherein the second lens unit includes, in order from the object side to the image side, a positive lens and a cemented lens in which a positive lens and a negative lens are cemented, and wherein the following conditions are satisfied:

$$0.100 < f2/fT < 0.425$$

$$1.75 < Npave < 2.50$$

where f2 is a focal length of the second lens unit, fT is a focal length of the entire zoom lens at a telephoto end, and Npave is an average refractive index of materials of the positive lenses included in the entire zoom lens.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 1 is a lens sectional view of a zoom lens at the wide-angle end according to a first exemplary embodiment of the present invention.

FIGS. 2A, 2B, and 2C are aberration diagrams of the zoom lens at the wide-angle end, a middle zoom position, and the telephoto end, respectively, according to the first exemplary embodiment.

FIGS. 4A, 4B, and 4C are aberration diagrams of the zoom lens at the wide-angle end, a middle zoom position, and the telephoto end, respectively, according to the second exemplary embodiment.

FIGS. 8A, 8B, and 8C are aberration diagrams of the zoom lens at the wide-angle end, a middle zoom position, and the telephoto end, respectively, according to the fourth exemplary embodiment.

DESCRIPTION OF THE EMBODIMENTS

Various exemplary embodiments, features, and aspects of the invention will be described in detail below with reference to the drawings.

A zoom lens according to an exemplary embodiment of the present invention includes, in order from an object side to an image side, a first lens unit having negative refractive power, a second lens unit having positive refractive power, and a third lens unit having positive refractive power. A distance between every adjacent ones of the first to third lens units varies during zooming.

Specifically, during zooming from the wide-angle end to the zoom position of the telephoto end, the first lens unit L1 corrects a variation on the image plan according to variable magnification by substantially reciprocating while moving along a part of a locus convex toward the image side. The second lens unit L2 performs a principal variable magnification by monotonously moving toward the object side. The third lens unit L3 moves toward the image side.

Figure 2B:
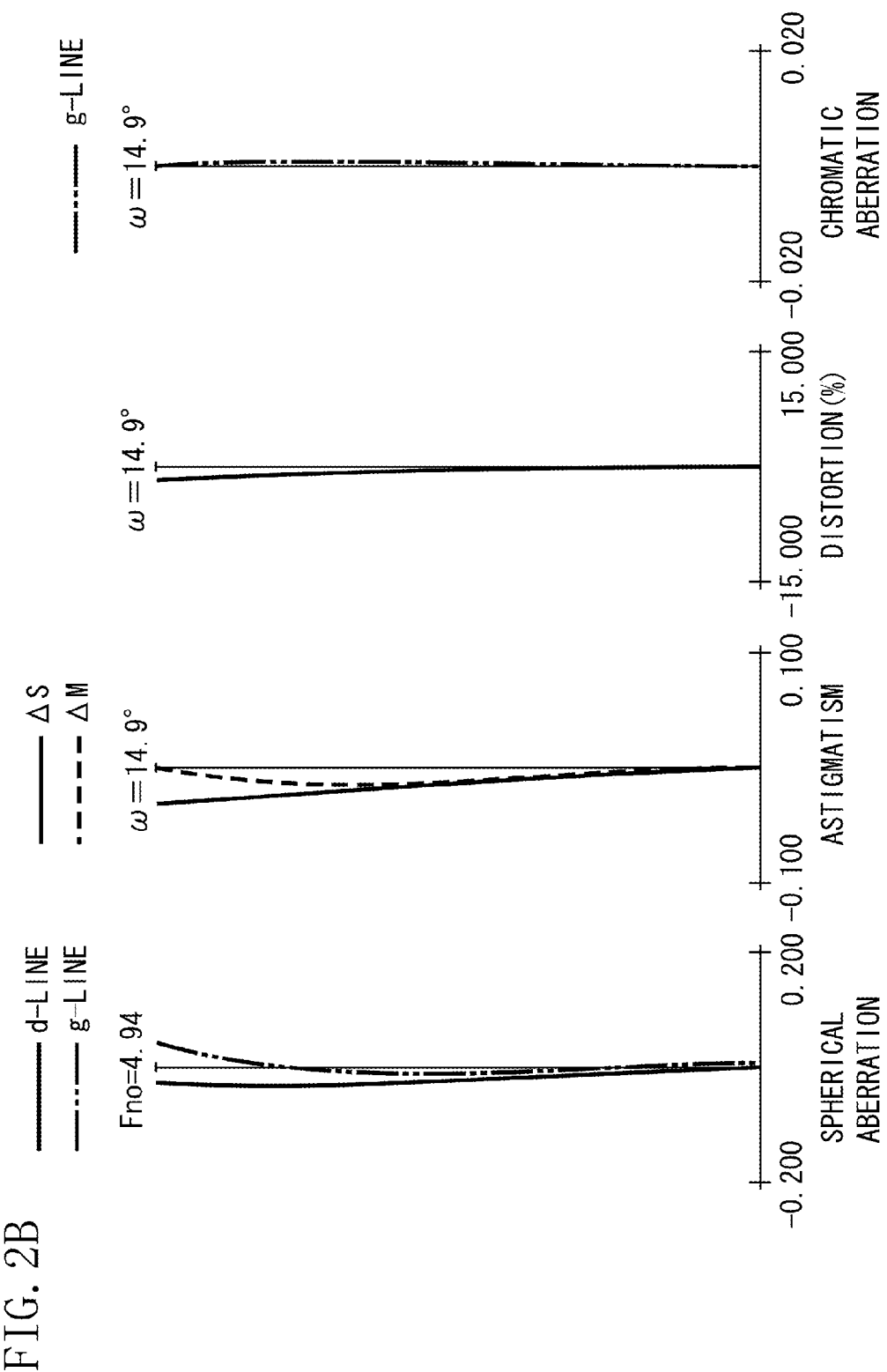
Figure 2C:
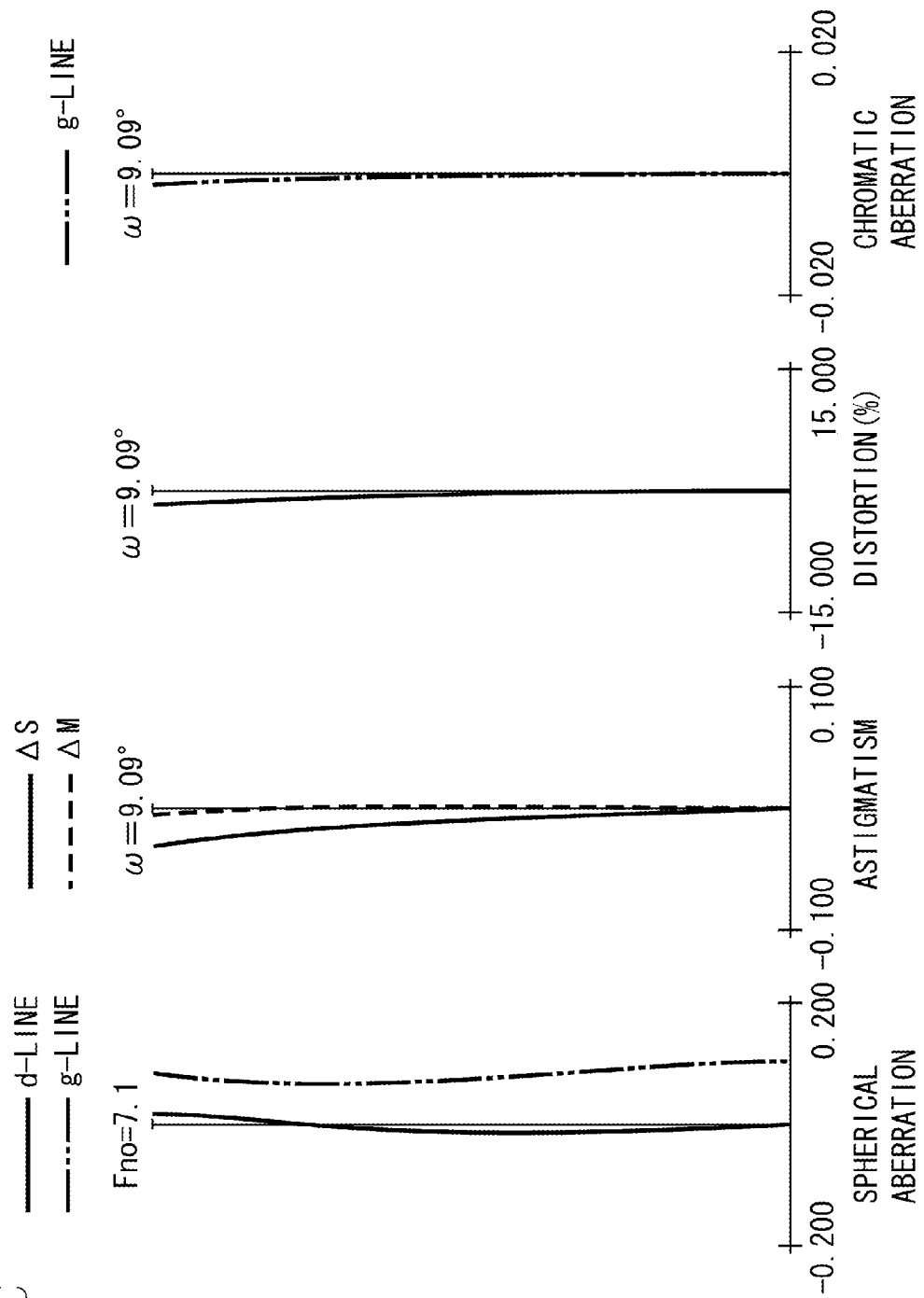

FIG. 1 is a lens sectional view of a zoom lens at the wide-angle end (short focal length end) according to a first exemplary embodiment of the present invention. FIGS. 2A, 2B, and 2C are aberration diagrams of the zoom lens at the wide-angle end, a middle zoom position, and the telephoto end, respectively, according to the first exemplary embodiment. The zoom lens according to the first exemplary embodiment has a zoom ratio of about 4.71 and an aperture ratio of about 2.83 to 7.10.

Figure 3:
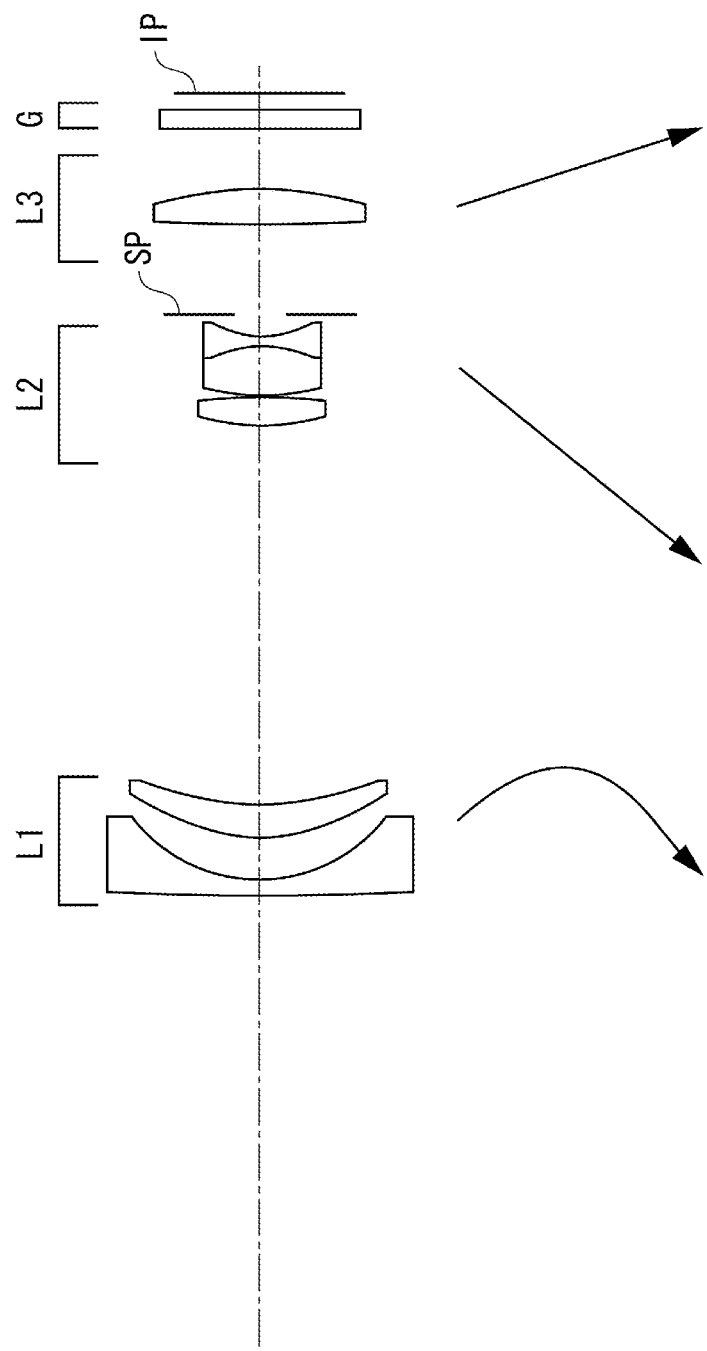
FIG. 3 is a lens sectional view of a zoom lens at the wide-angle end according to a second exemplary embodiment of the present invention.
Figure 4A:
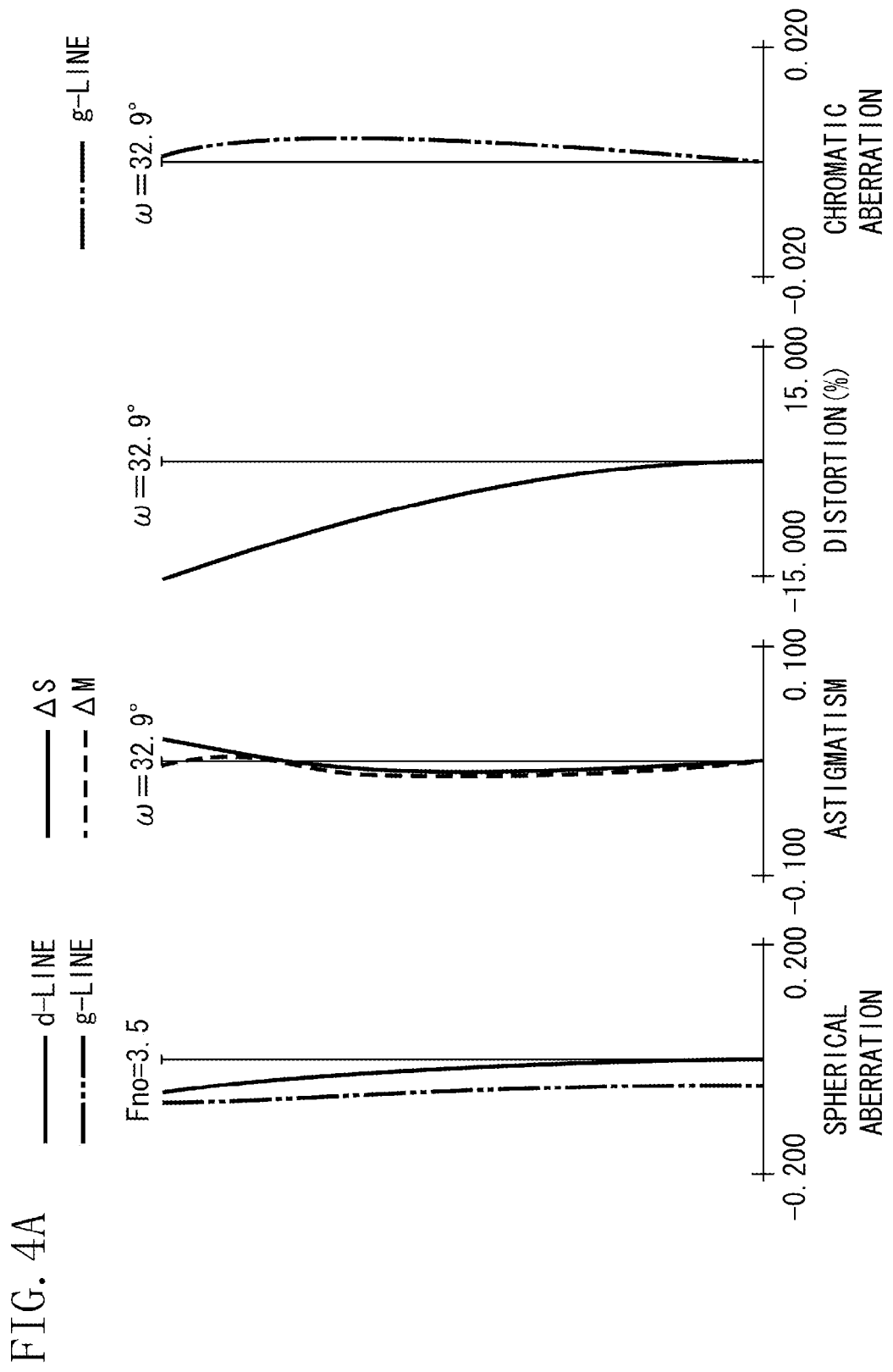
Figure 4B:
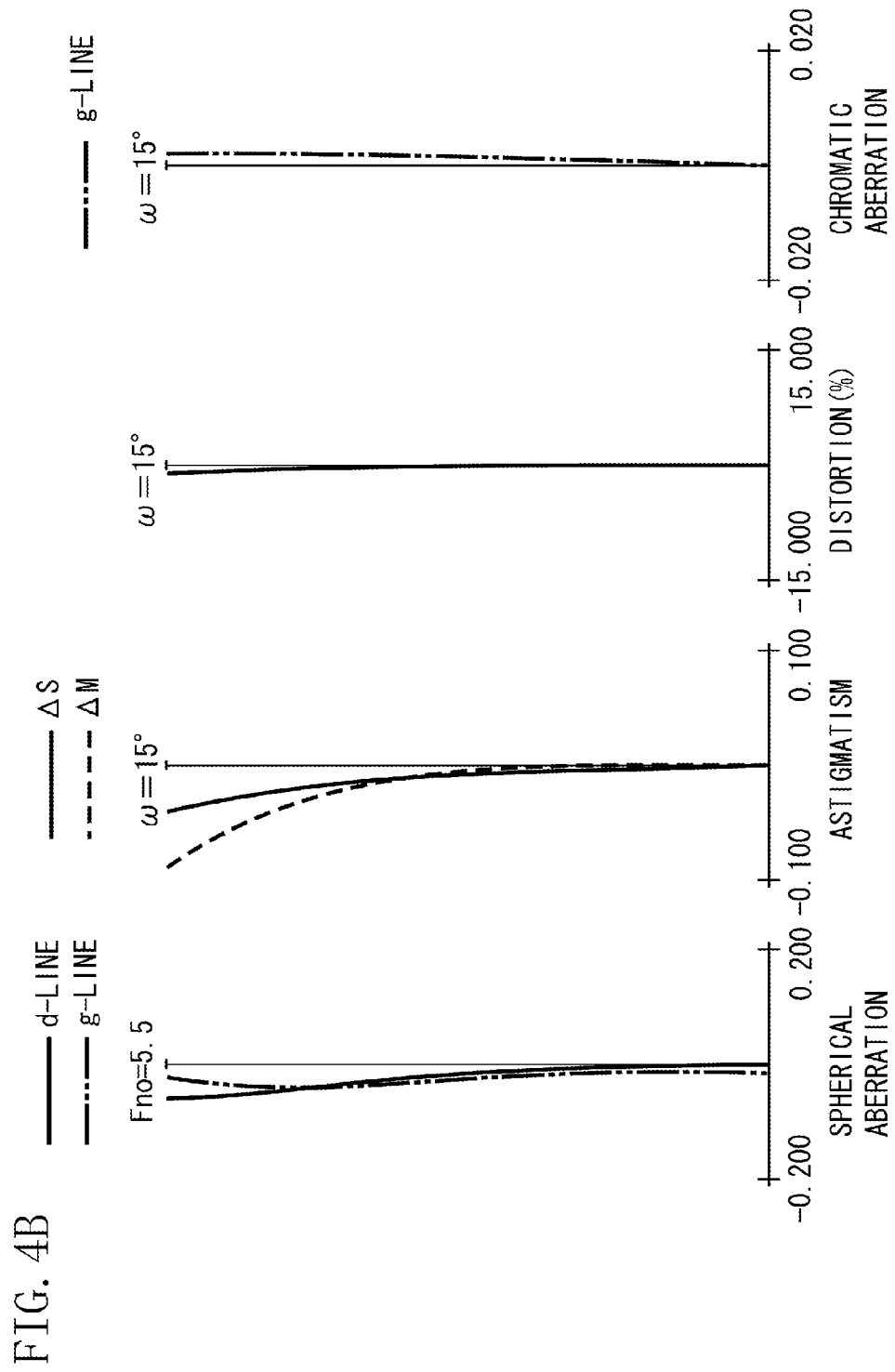

FIG. 3 is a lens sectional view of a zoom lens at the wide-angle end according to a second exemplary embodiment of the present invention. FIGS. 4A, 4B, and 4C are aberration diagrams of the zoom lens at the wide-angle end, a middle zoom position, and the telephoto end, respectively, according to the second exemplary embodiment. The zoom lens according to the second exemplary embodiment has a zoom ratio of about 5.44 and an aperture ratio of about 3.50 to 7.10.

Figure 5:
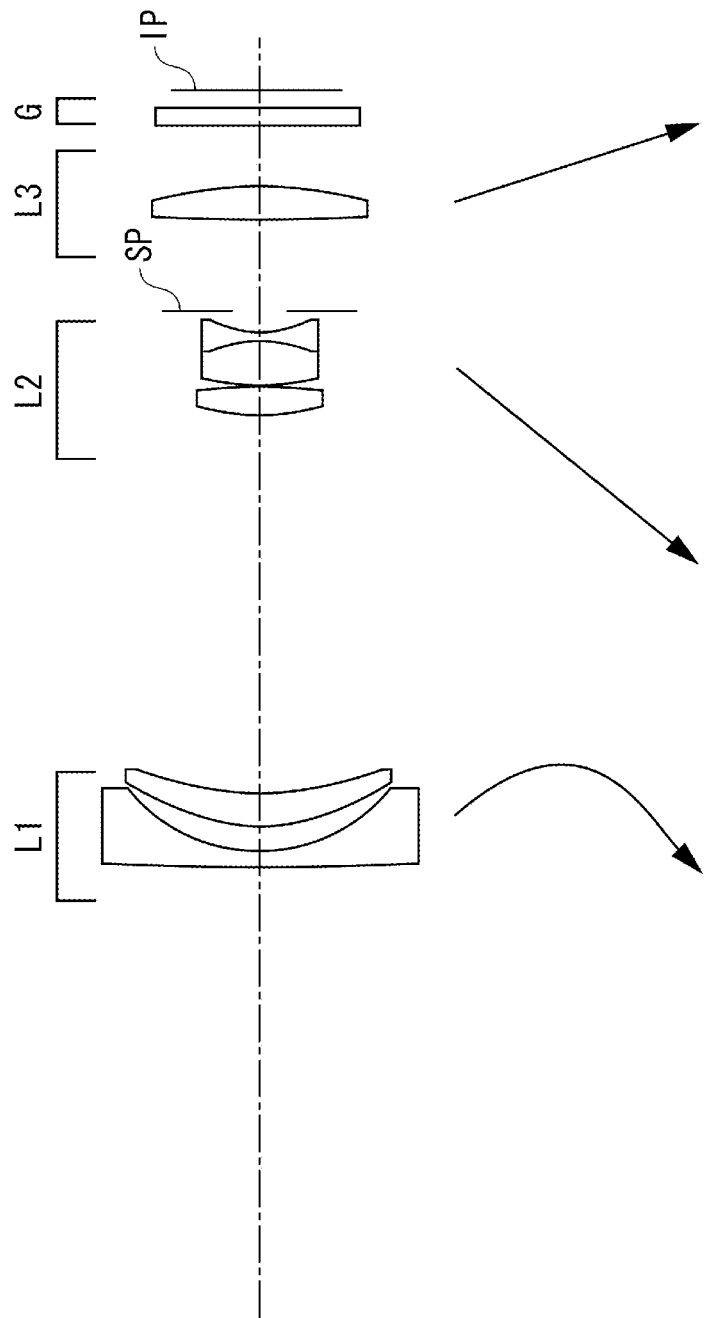
FIG. 5 is a lens sectional view of a zoom lens at the wide-angle end according to a third exemplary embodiment of the present invention.
Figure 6A:
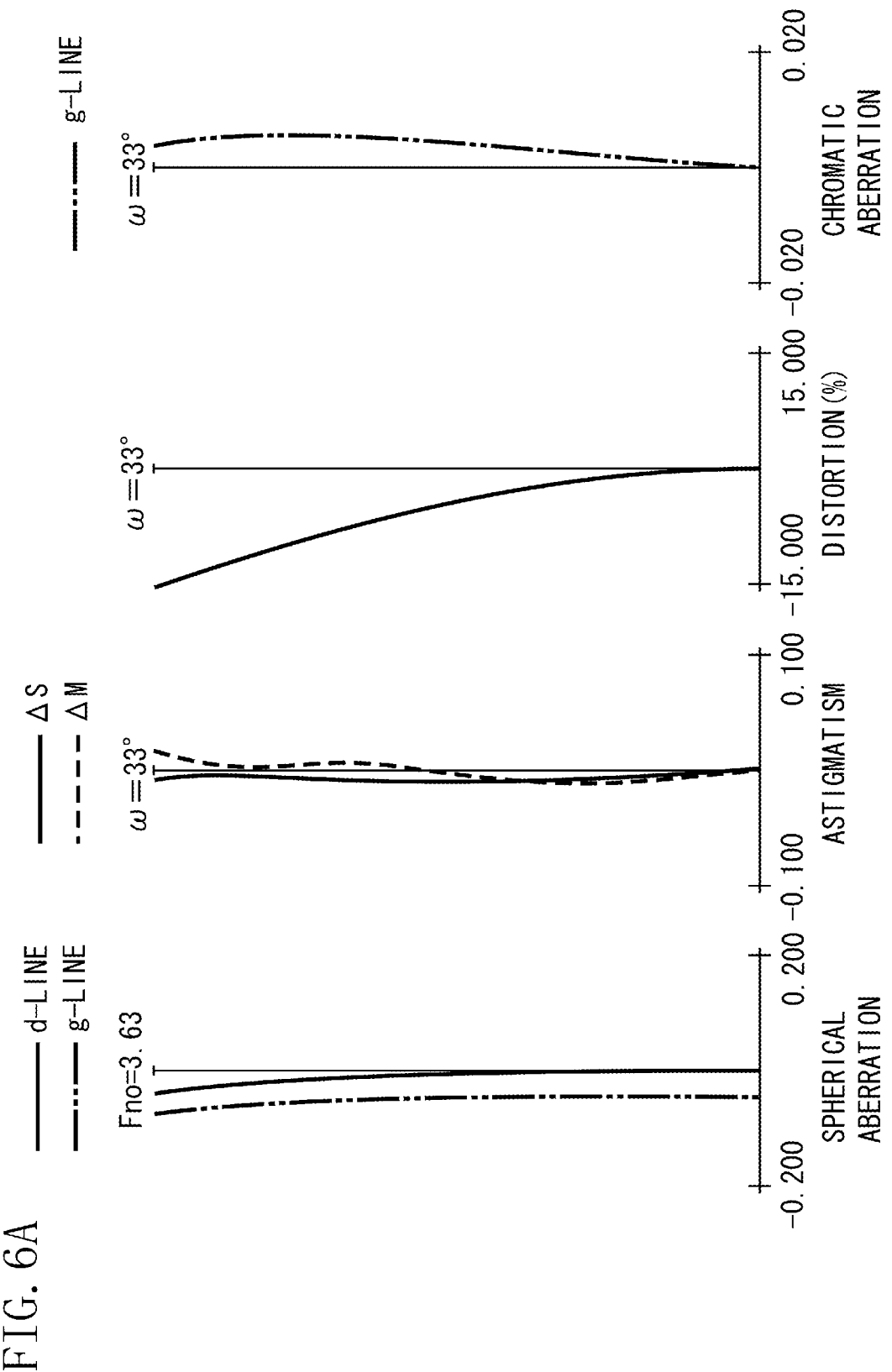
FIGS. 6A, 6B, and 6C are aberration diagrams of the zoom lens at the wide-angle end, a middle zoom position, and the telephoto end, respectively, according to the third exemplary embodiment.
Figure 6B:
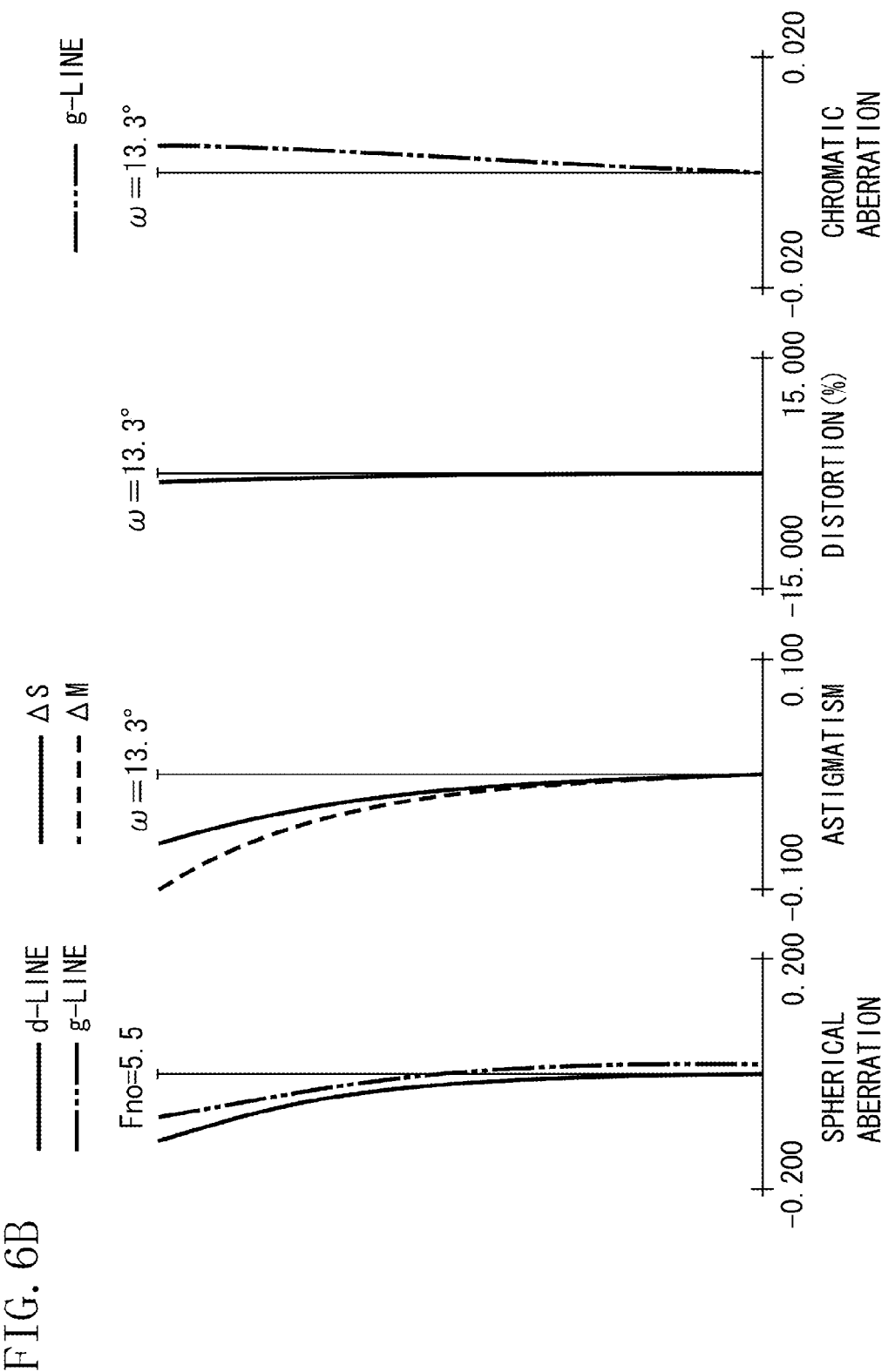
Figure 6C:
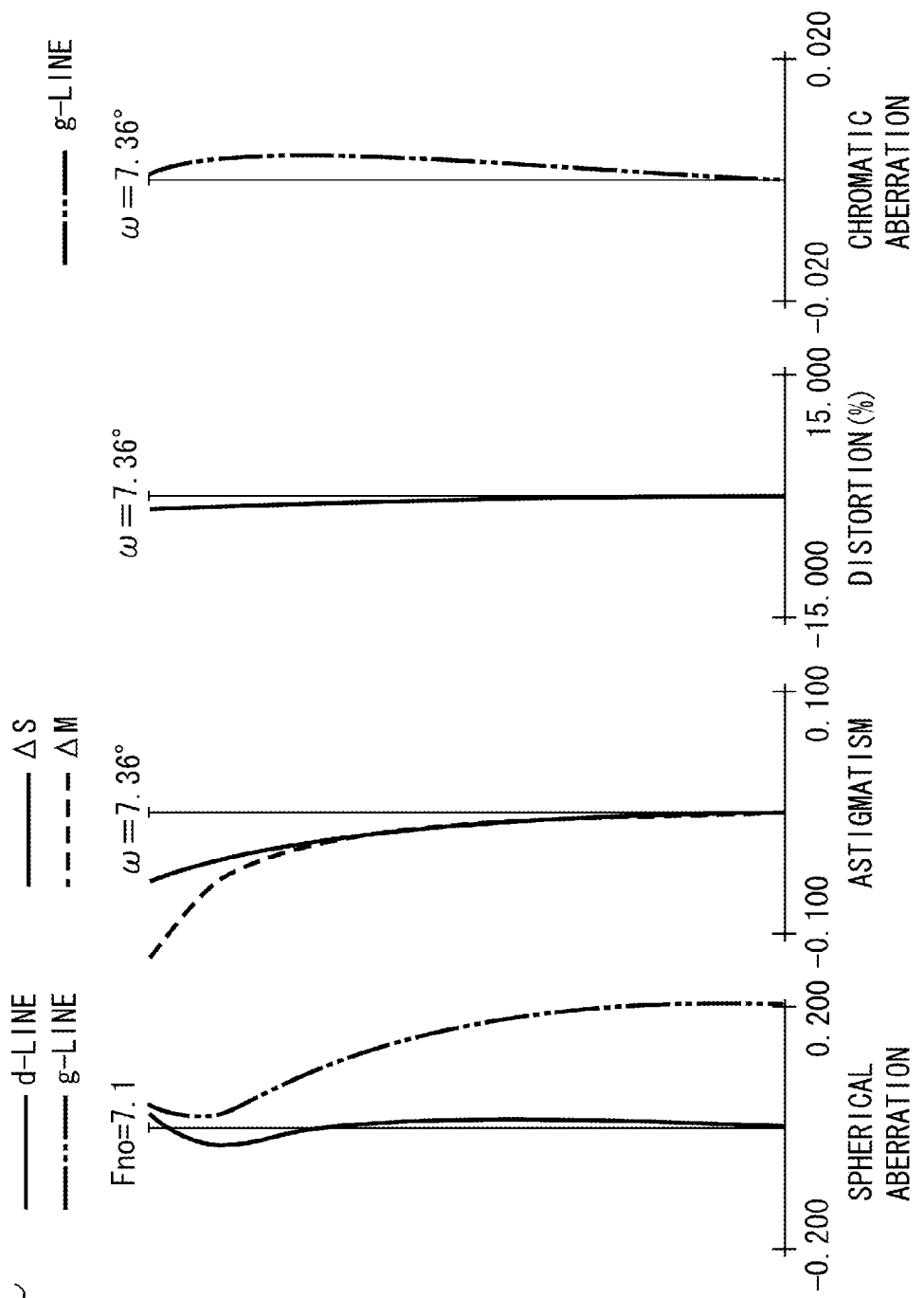

FIG. 5 is a lens sectional view of a zoom lens at the wide-angle end according to a third exemplary embodiment of the present invention. FIGS. 6A, 6B, and 6C are aberration diagrams of the zoom lens at the wide-angle end, a middle zoom position, and the telephoto end, respectively, according to the third exemplary embodiment. The zoom lens according to the third exemplary embodiment has a zoom ratio of about 5.84 and an aperture ratio of about 3.63 to 7.10.

Figure 7:
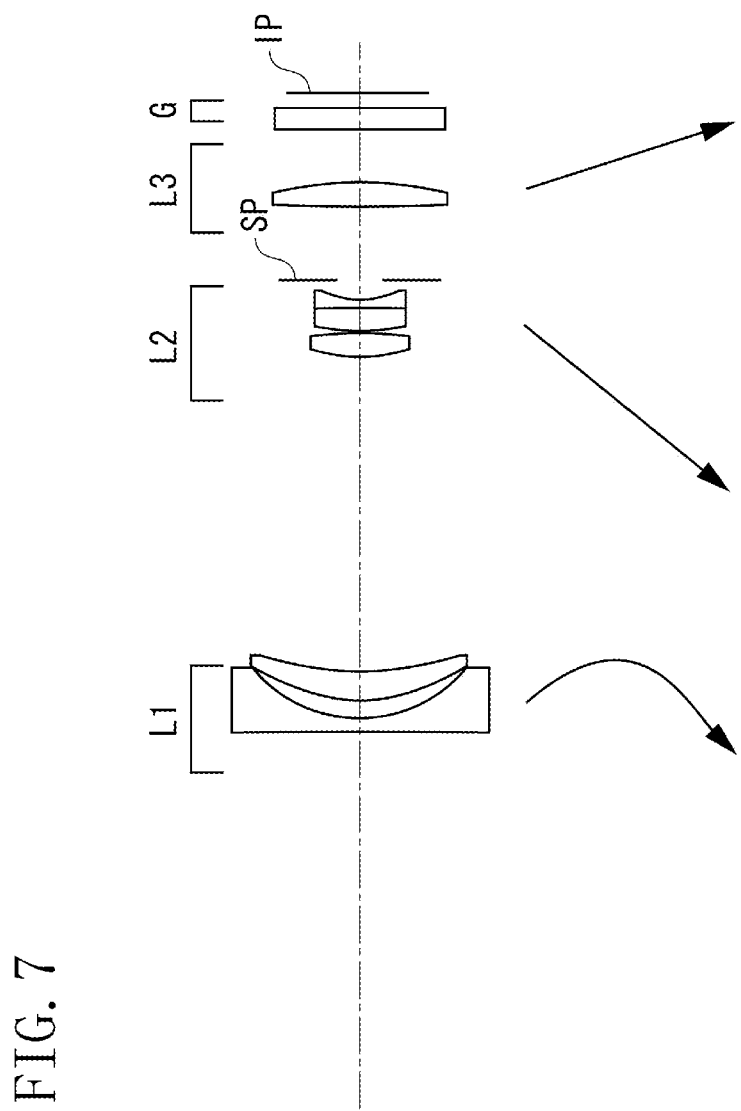
FIG. 7 is a lens sectional view of a zoom lens at the wide-angle end according to a fourth exemplary embodiment of the present invention.
Figure 8A:
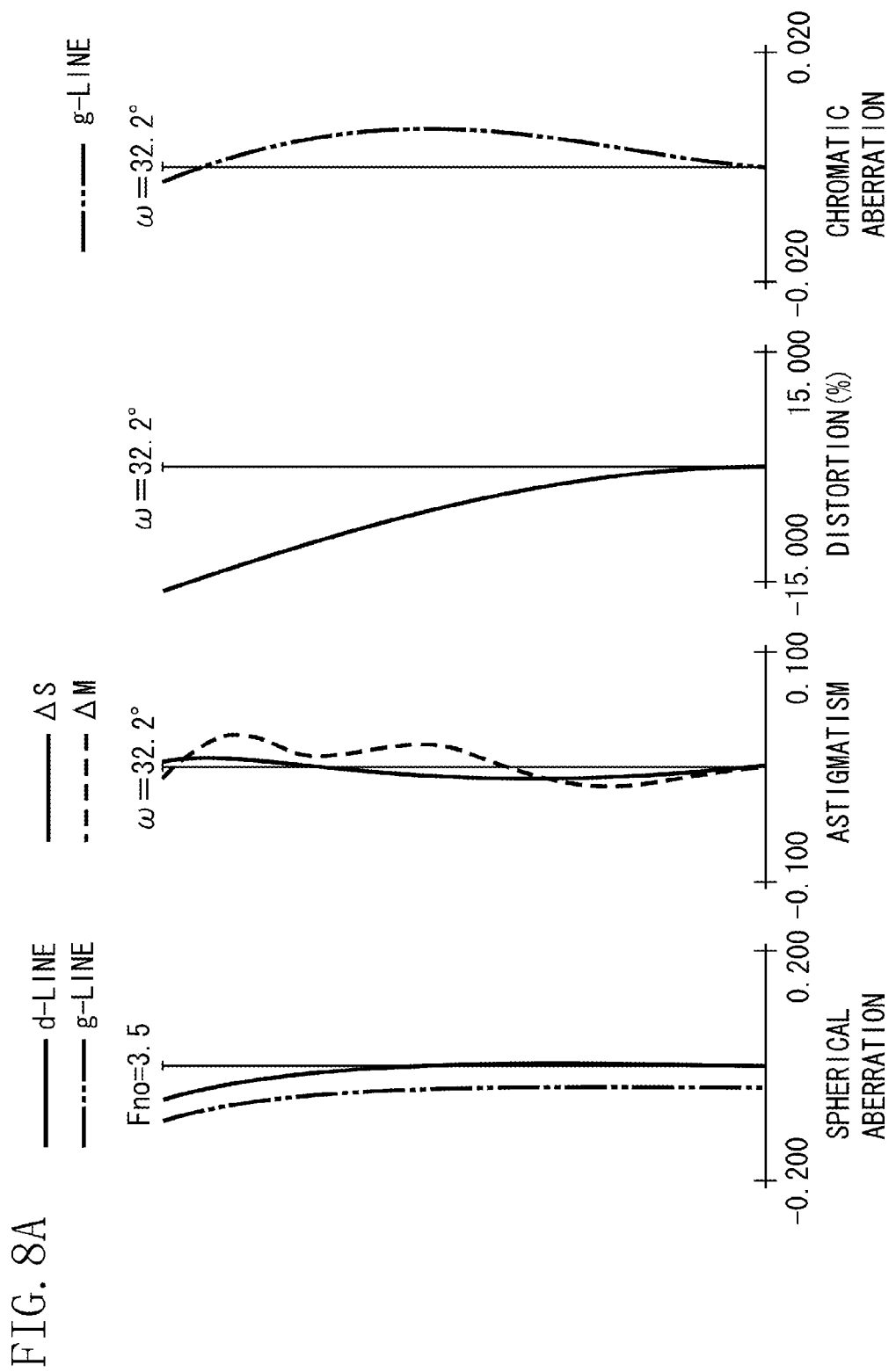
Figure 8C:
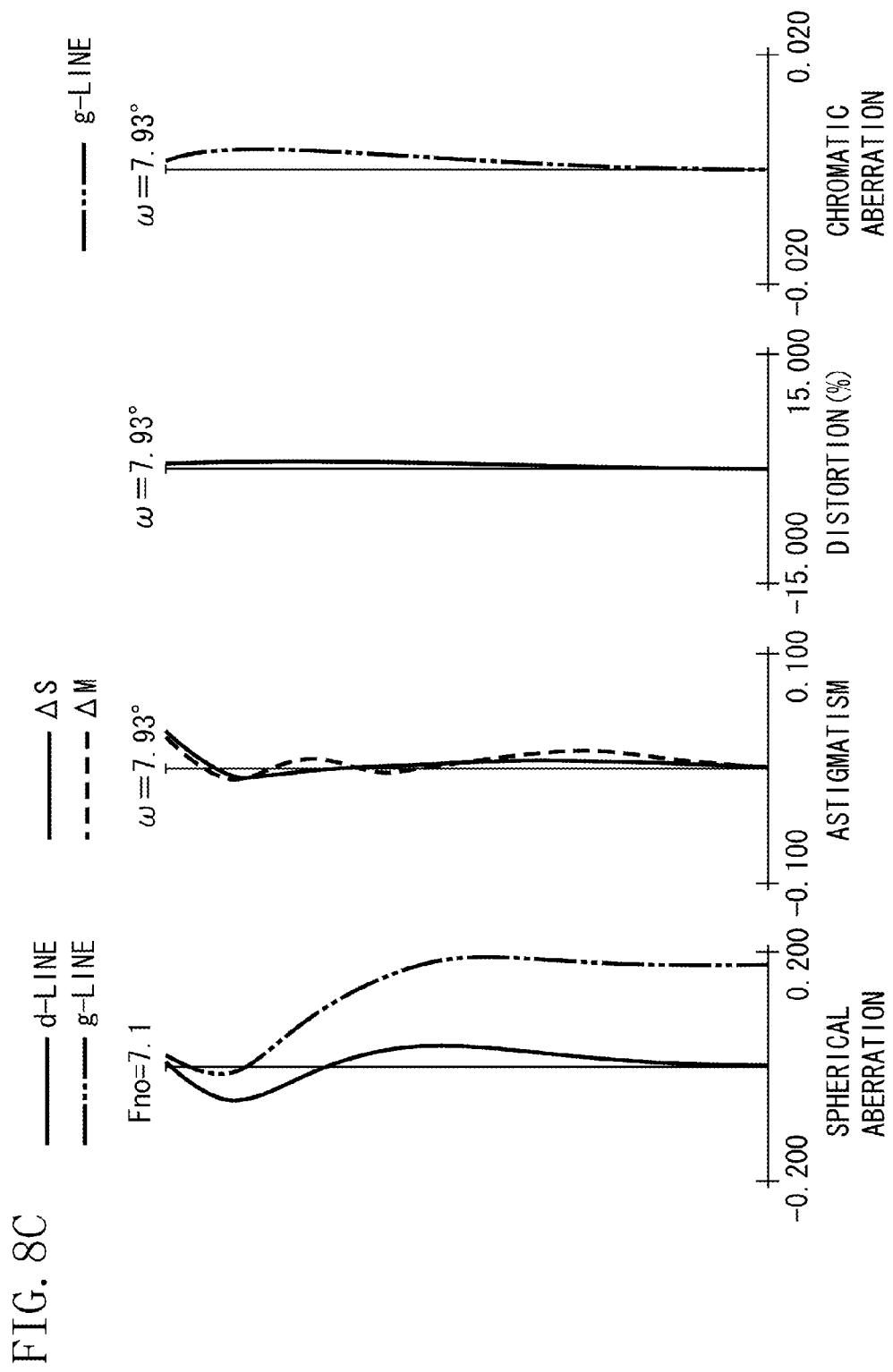
Figure 9:
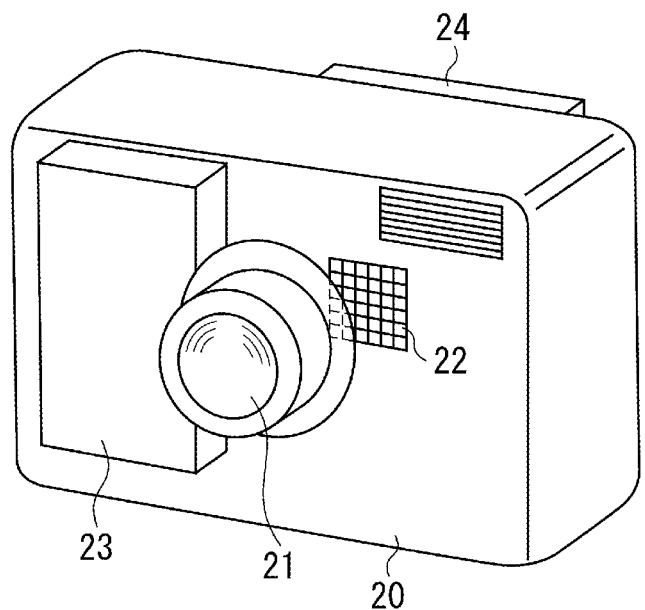
FIG. 9 is a schematic diagram illustrating principal portions of an image pickup apparatus according to an exemplary embodiment.

FIG. 7 is a lens sectional view of a zoom lens at the wide-angle end according to a fourth exemplary embodiment of the present invention. FIGS. 8A, 8B, and 8C are aberration diagrams of the zoom lens at the wide-angle end, a middle zoom position, and the telephoto end, respectively, according to the fourth exemplary embodiment. The zoom lens according to the fourth exemplary embodiment has a zoom ratio of about 5.39 and an aperture ratio of about 3.50 to 7.10. FIG. 9 is a schematic diagram illustrating principal portions of a digital still camera (image pickup apparatus) including the zoom lens according to the exemplary embodiments. In each lens sectional view, the left side is the object side (front side), and the right side is the image side (rear side).

In each lens sectional view, a first lens unit L1 has negative refractive power (optical power=reciprocal of focal length), a second lens unit L2 has positive refractive power, and a third lens unit L3 has positive refractive power. An F-number determination member (hereinafter, referred to as "aperture stop") acts as an aperture stop that determines (restricts) a full-aperture F-number (Fno) light flux. G denotes an optical block, such as an optical filter, a faceplate, a crystal low-pass filter, and an infrared cutoff filter.

IP denotes an image plane. When the zoom lens is used as a photographic optical system of a video camera or a digital still camera, an imaging surface of a solid-state image sensor (photoelectric conversion element), such as a charge-coupled device (CCD) sensor or a complementary metal-oxide semiconductor (CMOS) sensor, is placed on the image plane IP. Also, when the zoom lens is used as a photographic optical system of a silver-halide film camera, a photosensitive surface corresponding to a film surface is placed on the image plane IP. In each aberration diagram, d and F denote d-line and F-line, respectively, and $\Delta M$ and $\Delta S$ denote a meridional image plane and a sagittal image plane, respectively. Also, chromatic aberration of magnification is denoted by g-line.

Note that, in each of the following exemplary embodiments, the wide-angle end and the telephoto end refer to zooming positions when a lens unit for variable magnification is positioned at each of the ends of a range in which the lens unit for variable magnification is mechanically movable along an optical axis. In each lens sectional view, an arrow indicates a moving locus of each lens unit during zooming from the wide-angle end to the telephoto end.

In the zoom lens of each exemplary embodiment, during zooming from the wide-angle end to the telephoto end, the first lens unit L1 corrects a variation on the image plane according to variable magnification by substantially reciprocating while moving along a part of a locus convex toward the image side. The second lens unit L2 performs a principal variable magnification by monotonously moving toward the object side. The third lens unit L3 moves toward the image side. Focusing from an infinitely-distant object to a short-distance object is performed by moving the third lens unit L3 toward the object side.

In each exemplary embodiment, the second lens unit L2 includes, in order from the object side to the image side, a positive lens and a cemented lens in which a positive lens and a negative lens are cemented. A focal length of the second lens unit L2 is denoted by f2, a focal length of the entire zoom lens at the telephoto end is denoted by fT, and an average refractive index of materials of the positive lenses included in the entire zoom lens is denoted by Npave.

In this case, the following conditions are satisfied:

$$0.100 < f2/fT < 0.425 \tag{1}$$

$$1.75 < Npave < 2.50 \tag{2}$$

The technical significance of the conditions (1) and (2) will be described below. The condition (1) defines the relation between the focal length of the second lens unit L2 and the focal length of the entire zoom lens at the telephoto end. If the upper limit of the condition (1) is exceeded, spherical aberration greatly occurs over the entire zoom range in an overcorrected direction. Also, the variable magnification operation of the second lens unit L2 is degraded. Therefore, if it is intended to obtain a predetermined zoom ratio by lengthening the focal length of the telephoto end, an amount of movement of the second lens unit L2 during zooming is increased, and the total lens length is increased. If the lower limit of the condition (1) is exceeded, the refractive power of the second lens unit L2 becomes too strong. Therefore, curvature of field at the telephoto end greatly occurs in an undercorrected direction.

The condition (2) defines the average value of refractive indices of materials of all positive lens included in the entire zoom lens. For suppressing curvature of field over the entire zoom range, it is effective to reduce Petzval sum. For reducing Petzval sum, without increasing the number of lenses, it is effective to make the positive lens of a high-refractive-index material.

If the upper limit of the condition (2) is exceeded, the average value of refractive indices of the materials of the positive lenses is large. Therefore, in an actual glass material, dispersion also becomes too large. Axial chromatic aberration of g-line greatly occurs at the undercorrected side over the entire zoom range. If the lower limit of the condition (2) is exceeded and thus the average value of refractive indices of the materials of the positive lenses is too small, Petzval sum becomes too large, and curvature of field greatly occurs at the undercorrected side over the entire zoom range. By satisfying the conditions (1) and (2), it is possible to readily realize the zoom lens that reduces the total lens length, and has a high zoom ratio, a small curvature of field, and superior optical performance.

Note that, more desirably, the numerical ranges of the conditions (1) and (2) are desirably set as follows:

$$0.2 < f2/fT < 0.425 \quad (1a)$$

$$1.75 < \text{Npave} < 2.2 \quad (2a)$$

More desirably, the numerical ranges of the conditions (1a) and (2a) are desirably set as follows:

$$0.3 < f2/fT < 0.425 \quad (1b)$$

$$1.75 < \text{Npave} < 2.0 \quad (2b)$$

According to each exemplary embodiment, the size of the entire zoom lens can be reduced, and the zoom lens can have a high zoom ratio. Also, since curvature of field is excellently corrected over the entire zoom range, the zoom lens can have high optical performance over the entire zoom range.

In each exemplary embodiment, more desirably, the zoom lens desirably satisfies one or more of the following conditions. The focal lengths of the first lens unit L1 and the third lens unit L3 are denoted by f1 and f3, respectively. An imaging magnification of the second lens unit L2 at the wide-angle end is denoted by $\beta 2w$, and an imaging magnification of the second lens unit L2 at the telephoto end is denoted by $\beta 2t$.

The average value of focal lengths of all positive lens included in the entire zoom lens is denoted by fpave, and the average value of focal lengths of all negative lens included in the entire zoom lens is denoted by fnave. The average value of Abbe numbers of materials of all positive lenses included in the entire zoom lens is denoted by vpave. The radius of curvature of the cemented lens surface of the cemented lens of the second lens unit L2 is denoted by R2c.

In this case, it is desirable to satisfy one or more of the following conditions:

$$0.5 < f3/fT < 1.0 \quad (3)$$

$$0.3 < |f1/f3| < 0.7 \quad (4)$$

$$4.55 < \beta 2t/\beta 2w < 8.00 \quad (5)$$

$$1.0 < |\text{fpave}/\text{fnave}| < 2.6 \quad (6)$$

$$30 < \text{vpave} < 45 \quad (7)$$

$$-1.10 < R2c/fT < -0.05 \quad (8)$$

The technical significance of the above conditions will be described below.

The condition (3) defines the relation between the focal length of the third lens unit L3 and the focal length of the entire zoom lens at the telephoto end. If the upper limit of the condition (3) is exceeded and thus the focal length of the third lens unit L3 is too large to the focal length of the entire zoom lens at the telephoto end, it is difficult to separate an exit pupil away from the image plane. Therefore, an incidence angle of the off-axis light beam is increased, and a large amount of shading occurs. Also, when focusing is performed with the third lens unit L3, an amount of movement for focusing is increased and the size of the entire zoom lens is increased. If the lower limit of the condition (3) is exceeded, the refractive power of the third lens unit L3 to the refractive power of the entire zoom lens becomes too strong. Therefore, curvature of field at the telephoto end greatly occurs at the undercorrected side.

The condition (4) defines the relation between the focal length of the first lens unit L1 and the focal length of the third lens unit L3. If the upper limit of the condition (4) is exceeded and thus the focal length of the first lens unit L1 is too large relative to the focal length of the third lens unit L3, chromatic aberration of magnification of g-line at the wide-angle end greatly occurs at the overcorrected side. Also, since the refractive power of the first lens unit L1 becomes too weak to the focal length of the third lens unit L3, the effect of bending an off-axis light beam at the wide-angle end is weakened.

The optical effective diameter of the first lens unit L1 is determined by the incidence height of an off-axis light beam at the wide-angle end. Therefore, if the effect of bending the off-axis light beam at the wide-angle end is weakened, the lens radius of the first lens unit L1 is increased, and downsizing becomes difficult. If the lower limit of the condition (4) is exceeded, the refractive power of the first lens unit L1 to the refractive power of the entire zoom lens becomes too strong. Therefore, curvature of field at the wide-angle end greatly occurs at the overcorrected side.

The condition (5) defines a ratio of variable magnification ratios of the second lens unit L2 at the wide-angle end and the telephoto end. If the upper limit of the condition (5) is exceeded, the variable magnification sharing of the second lens unit L2 becomes excessive during zooming from the wide-angle end to the telephoto end. Therefore, when the refractive power of the second lens unit L2 is made constant, an amount of movement of the second lens unit L2 is increased. As a result, the total lens length at the telephoto end is increased, and it is difficult to downsize the entire zoom lens.

Also, when an amount of movement of the second lens unit L2 during zooming is made constant, the refractive power of the second lens unit L2 becomes too strong. Therefore, Petzval sum is increased, and curvature of field greatly occurs at the undercorrected side over the entire zoom range. If the lower limit of the condition (5) is exceeded, a variation in the variable magnification ratio of the second lens unit L2 becomes small. Therefore, it is difficult to obtain a desired zoom ratio.

The condition (6) defines a ratio of the average value of focal lengths of all positive lens included in the entire zoom lens to the average value of focal lengths of negative lenses. If the upper limit of the condition (6) is exceeded, the refractive power of the positive lens to the negative lens becomes too loose on average. Therefore, it is difficult to correct chromatic aberration over the entire zoom range. In particular, axial chromatic aberration of g-line at the telephoto end greatly occurs at the overcorrected side. If the lower limit of the condition (6) is exceeded, the refractive power of the positive lens relative to the negative lens becomes too tight on average. Therefore, even when a high-refractive-index material is used for the positive lens, it is difficult to reduce Petzval sum. As a result, curvature of field greatly occurs at the undercorrected side over the entire zoom range.

The condition (7) defines the average value of Abbe numbers of materials of all positive lenses included in the entire zoom lens. If the upper limit of the condition (7) is exceeded, the material of the positive lens becomes too low dispersion on average. Therefore, in particular, in the first lens unit L1, it is difficult to take an Abbe number difference from the negative lens. As a result, it is difficult to correct chromatic aberration occurring within the first lens unit L1. Also, chromatic aberration of magnification of g-line at the wide-angle end greatly occurs at the overcorrected side. If the lower limit of the condition (7) is exceeded, the material of the positive lens becomes too high dispersion on average. Therefore, axial chromatic aberration of g-line greatly occurs over the entire zoom range.

The condition (8) defines the relation between the radius of curvature of the cemented lens surface of the cemented lens in the second lens unit L2 and the focal length of the entire zoom lens at the telephoto end. If the focal length of the entire zoom lens at the telephoto end is fixed, the curvature of the cemented lens surface becomes too loose when the lower limit of the condition (8) is exceeded. Therefore, spherical aberration at the telephoto end greatly occurs at the overcorrected side. If the upper limit of the condition (8) is exceeded and thus the radius of curvature of the cemented lens surface becomes small, the curvature of the cemented lens surface becomes too tight. Therefore, curvature of field at the wide-angle end greatly occurs at the overcorrected side.

For further increased effect of the exemplary embodiment, the numerical ranges of the conditions (3) to (8) are desirably set as follows:

$$0.6 < f3/fT < 0.9 \tag{3a}$$

$$0.5 < |f1/f3| < 0.7 \tag{4a}$$

$$4.55 < \beta 2t/\beta 2w < 6.00 \tag{5a}$$

$$1.50 < |fpave/fnave| < 2.58 \tag{6a}$$

$$33 < vpave < 45 \tag{7a}$$

$$-1.10 < R2c/fT < -0.1 \tag{8a}$$

Next, the lens configuration of the zoom lens of each exemplary embodiment will be described.

In the zoom lens of each exemplary embodiment, the respective lens units are moved such that, during zooming, a distance between the first lens unit L1 and the second lens unit L2 becomes narrower at the telephoto end than the wide-angle end, and a distance between the second lens unit L2 and the third lens unit L3 becomes wider at the telephoto end than the wide-angle end. In addition, at the telephoto end rather than the wide-angle end, the second lens unit L2 is disposed on the object side. Also, the first lens unit L1 moves with a locus convex toward the image side.

The aperture stop SP is located within the second lens unit L2 in the first exemplary embodiment illustrated in FIG. 1, and is located on the image side as compared with the second lens unit L2 in the second, third, and fourth exemplary embodiments of FIGS. 3, 5, and 7. By arranging the aperture stop SP in the above-described manner, the distance between the first lens unit L1 and the second lens unit L2 at the telephoto end can be narrowed. Therefore, an amount of variation in the distance between the first lens unit L1 and the second lens unit L2 for zooming can be sufficiently secured. In this manner, the zoom lens having a high zoom ratio is achieved.

The variable magnification during zooming is mainly performed by the second lens unit L2. The correction of the focus variation caused by zooming is mainly performed by the first lens unit L1. The focusing is performed by moving the first lens unit L1 or the third lens unit L3 in a direction of an optical axis. The first lens unit L1 includes, in order from the object side to the image side, a negative lens having a surface concave toward the image side, and a positive lens having a surface convex toward the object side. The first lens unit L1 reduces the effective diameter of the front lens and performs chromatic aberration correction. Also, both of the negative lens and the positive lens are made of a high-refractive-index material, so that the curvature of the lens surface becomes loose to a desired refractive power. Therefore, the occurrence of curvature of field at the wide-angle end and spherical aberration at the telephoto end is reduced.

Also, the configuration is made such that a high-dispersion material having a small Abbe number is used as the material of the positive lens and an Abbe number difference from the material of the negative lens can be sufficiently taken. Chromatic aberration is corrected without increasing the refractive power. In addition, by forming at least one surface of the negative lens in an aspheric surface shape, a wide angle of view is achieved, and the entire zoom lens is downsized. Also, curvature of field and astigmatism at the wide-angle end are effectively corrected. Even when the surface having the aspheric surface shape is provided to the positive lens, a similar effect can be obtained.

The second lens unit L2 includes, in order from the object side to the image side, a positive lens having a surface convex toward the object side, and a cemented lens having overall negative refractive power, in which a positive lens and a negative lens are cemented. In this manner, the reduction in the thickness of the second lens unit L2 is achieved, and spherical aberration and curvature of field are effectively corrected.

In addition, since the positive lens constituting the second lens unit L2 is made of a high-refractive-index material, Petzval sum is reduced and curvature of field is effectively corrected. It is necessary to strengthen the refractive power of the second lens unit L2 to achieve a high zoom ratio and the downsizing of the entire zoom lens. However, by using a high-refractive-index material in the positive lens, flatness of the image plane is excellently maintained when aiming at a high zoom ratio.

The third lens unit L3 includes a single positive lens. In each exemplary embodiment, focusing is performed by the third lens unit L3. Since the reduction in the weight of the third lens unit L3 can be achieved, rapid focusing is facilitated. Also, since the positive lens of the third lens unit L3 is made of a high-refractive-index material, the thickness of the third lens unit L3 is reduced and Petzval sum is reduced. Note that, in each exemplary embodiment, by moving an arbitrary lens unit such that the lens unit has a component of a direction perpendicular to the optical axis, a camera shake may be performed to move an image forming position in a direction perpendicular to the optical axis.

In addition, the zoom lens according to the exemplary embodiment may be used with a system (image forming position) that corrects an electrical signal, including distortion aberration and chromatic aberration of magnification, by image processing. According to this, higher optical performance can be easily obtained over the entire zoom range.

Next, numerical examples of the respective exemplary embodiments of the present invention will be described. In each numerical example, i denotes an order of a surface from the object side.

In each numerical example, ri denotes a radius of curvature of an i-th lens surface in order from the object side, di denotes an air distance and thickness of an i-th lens in order from the object side, ndi and vdi respectively denote refractive index and Abbe number of a material of an i-th lens to d-line. Also, two surfaces closest to the image side are filter members, such as a crystal low-pass filter and an infrared cutoff filter. A back focus (BF) is represented by a distance from the last surface (filter member surface) to the image plane. When X-axis is a direction of the optical axis, H-axis is a direction perpendicular to the optical axis, a light traveling direction is set as positive, R is a paraxial radius of curvature, K is a conic constant, and A4, A6, and A8 are aspheric coefficients, an aspheric surface shape is expressed as:

$$x = \frac{(1/R)H^2}{1+\sqrt{1-(1+K)(H/R)^2}} + A4 \times H^4 + A6 \times H^6 + A8 \times H^8 \times A10 \times H^{10} + A12 \times H^{12}$$

Also, [e+X] means [x10$^{+x}$], and [e−X] means [x10$^{-x}$]. The aspheric surface is indicated by adding * after a surface number. Also, the relation between the above-described conditions and the numerical examples is given in Table 1 below.

NUMERICAL EXAMPLE 1

Unit: mm

Surface Data

| Surface Number | r | d | nd | vd |
|---|---|---|---|---|
| 1* | −244.000 | 0.70 | 1.84954 | 40.1 |
| 2* | 7.400 | 1.88 | | |
| 3 | 9.022 | 1.45 | 1.92286 | 18.9 |
| 4 | 13.950 | (d4) | | |
| 5* | 6.285 | 1.35 | 1.62263 | 58.2 |
| 6* | −21.918 | 0.28 | | |
| 7 (Stop) | ∞ | −0.18 | | |
| 8 | 11.300 | 2.10 | 1.80400 | 46.6 |
| 9 | −4.980 | 0.40 | 1.64769 | 33.8 |
| 10 | 3.670 | (d10) | | |
| 11 | 67.232 | 1.55 | 1.69680 | 55.5 |
| 12 | −17.500 | (d12) | | |
| 13 | ∞ | 0.95 | 1.51633 | 64.1 |
| 14 | ∞ | 0.78 | | |
| Image Plane | ∞ | | | |

Aspheric Surface Data

First Surface

K = 0.00000e+000   A4 = 1.27407e−004   A6 = 3.26078e−006
A8 = −1.64099e−007   A10 = 2.83084e−009   A12 = −1.72672e−011

Second Surface

K = −2.19503e−001   A4 = 1.62728e−004   A6 = 1.06193e−005
A8 = −2.48633e−007   A10 = 1.45984e−009   A12 = 6.10273e−011

Fifth Surface

K = 5.69257e−001   A4 = −1.14859e−003   A6 = −4.99588e−005
A8 = −1.33037e−006   A10 = −3.24329e−008

Sixth Surface

K = 5.33718e+000   A4 = 3.99345e−004   A6 = −2.60507e−005

Various Data
Zoom Ratio 4.71

| | | | |
|---|---|---|---|
| Focal Length | 5.15 | 14.58 | 24.23 |
| F-number | 2.83 | 4.94 | 7.10 |
| Half Angle of View | 32.91 | 14.89 | 9.09 |
| Image Height | 3.33 | 3.88 | 3.88 |
| Total lens Length | 35.71 | 31.28 | 37.25 |
| BF | 0.78 | 0.78 | 0.78 |
| d4 | 16.71 | 3.39 | 0.47 |
| d10 | 5.00 | 14.12 | 23.19 |
| d12 | 2.75 | 2.52 | 2.34 |

Zoom Lens Unit Data

| Unit | Starting Surface | Focal Length | Lens Configuration Length |
|---|---|---|---|
| 1 | 1 | −13.54 | 4.03 |
| 2 | 5 | 10.07 | 3.95 |
| 3 | 11 | 20.08 | 1.55 |

Single-lens Data

| Lens | Starting Surface | Focal Length |
|---|---|---|
| 1 | 1 | −8.44 |
| 2 | 3 | 24.25 |
| 3 | 5 | 7.99 |
| 4 | 8 | 4.56 |
| 5 | 9 | −3.20 |
| 6 | 11 | 20.08 |

NUMERICAL EXAMPLE 2

Unit: mm

Surface Data

| Surface Number | r | d | nd | vd |
|---|---|---|---|---|
| 1* | −200.369 | 0.70 | 1.84954 | 40.1 |
| 2* | 7.341 | 1.88 | | |
| 3 | 9.027 | 1.45 | 1.92286 | 18.9 |
| 4 | 13.985 | (d4) | | |
| 5* | 6.865 | 1.26 | 1.61881 | 63.9 |
| 6* | −40.897 | 0.10 | | |
| 7* | 7.420 | 2.27 | 1.83481 | 42.7 |
| 8 | −5.252 | 0.34 | 1.73800 | 32.3 |
| 9 | 3.812 | 1.05 | | |
| 10(Stop) | ∞ | (d10) | | |
| 11 | 49.186 | 1.55 | 1.71300 | 53.9 |
| 12 | −20.077 | (d12) | | |
| 13 | ∞ | 0.80 | 1.51633 | 64.1 |
| 14 | ∞ | 0.78 | | |
| Image Plane | ∞ | | | |

-continued

Unit: mm

Aspheric Surface Data

First Surface

K = 0.00000e+000  A4 = 1.93428e−004  A6 = 4.62720e−006
A8 = −2.39825e−007  A10 = 3.89688e−009  A12 = −2.57932e−011

Second Surface

K = 1.76121e−002  A4 = 1.59556e−004  A6 = 1.56727e−005
A8 = −6.44288e−007  A10 = 1.96194e−008  A12 = −3.58599e−010

Fifth Surface

K = 1.01292e+000  A4 = −4.98722e−004  A6 = 7.46824e−005
A8 = −3.05102e−006  A10 = −8.70046e−008

Sixth Surface

K = 7.96479e+000  A4 = 6.28257e−004  A6 = 9.22628e−005
A8 = −8.70775e−006

Seventh Surface

K = −1.94418e−002  A4 = −7.50433e−005  A6 = −1.05487e−005
A8 = −6.37663e−006

Various Data
Zoom Ratio 5.44

|  |  |  |  |
|---|---|---|---|
| Focal Length | 5.15 | 14.44 | 28.00 |
| F-number | 3.50 | 5.50 | 7.10 |
| Half Angle of View | 32.91 | 15.02 | 7.88 |
| Total lens length | 35.57 | 31.53 | 40.34 |
| BF | 0.78 | 0.78 | 0.78 |
| d4 | 16.71 | 3.87 | 0.36 |
| d10 | 3.94 | 13.17 | 25.80 |
| d12 | 2.75 | 2.32 | 2.00 |

Zoom Lens Unit Data

| Unit | Starting Surface | Focal Length |
|---|---|---|
| 1 | 1 | −13.26 |
| 2 | 5 | 10.00 |
| 3 | 11 | 20.18 |

Single-lens Data

| Lens | Starting Surface | Focal Length |
|---|---|---|
| 1 | 1 | −8.32 |
| 2 | 3 | 24.19 |
| 3 | 5 | 9.60 |
| 4 | 7 | 4.01 |
| 5 | 8 | −2.95 |
| 6 | 11 | 20.18 |

NUMERICAL EXAMPLE 3

Unit: mm

Surface Data

| Surface Number | r | d | nd | vd |
|---|---|---|---|---|
| 1* | −94.563 | 0.70 | 1.84954 | 40.1 |
| 2* | 7.540 | 1.19 |  |  |
| 3 | 8.586 | 1.45 | 2.00272 | 19.3 |
| 4 | 13.178 | (d4) |  |  |
| 5* | 6.302 | 1.26 | 1.69680 | 55.5 |
| 6* | −129.551 | 0.10 |  |  |
| 7* | 8.966 | 1.95 | 1.85135 | 40.1 |
| 8 | −5.729 | 0.36 | 1.69895 | 30.1 |
| 9 | 3.847 | 1.05 |  |  |
| 10(Stop) | ∞ | (d10) |  |  |
| 11 | 58.203 | 1.50 | 1.69680 | 55.5 |
| 12 | −17.689 | (d12) |  |  |
| 13 | ∞ | 0.80 | 1.51633 | 64.1 |
| 14 | ∞ | 0.77 |  |  |
| Image Plane | ∞ |  |  |  |

Aspheric Surface Data

First Surface

K = 0.00000e+000  A4 = 1.40761e−004  A6 = 6.45121e−006
A8 = −2.46671e−007  A10 = 3.43030e−009  A12 = −2.18708e−011

Second Surface

K = −1.35886e−002  A4 = 1.11873e−004  A6 = 1.71606e−005
A8 = −6.23979e−007  A10 = 1.96950e−008  A12 = −3.80446e−010

Fifth Surface

K = 9.35720e−001  A4 = −7.55875e−004  A6 = 3.49405e−005
A8 = −1.02020e−006  A10 = −8.70046e−008

Sixth Surface

K = −5.07561e+002  A4 = 7.39165e−004  A6 = 1.55692e−005
A8 = −1.22381e−006

Seventh Surface

K = 8.02453e−001  A4 = −8.79521e−005  A6 = −5.20097e−005
A8 = −1.76970e−006

Various Data
Zoom Ratio 5.84

|  |  |  |  |
|---|---|---|---|
| Focal Length | 5.13 | 16.42 | 30.00 |
| F-number | 3.63 | 5.50 | 7.10 |
| Half Angle of View | 32.98 | 13.28 | 7.36 |
| Total Lens Length | 34.52 | 31.32 | 40.41 |
| BF | 0.77 | 0.77 | 0.77 |
| d4 | 16.71 | 3.16 | 0.33 |
| d10 | 3.94 | 14.72 | 26.96 |
| d12 | 2.75 | 2.32 | 2.00 |

Zoom Lens Unit Data

| Unit | Starting Surface | Focal Length | Lens Configuration Length |
|---|---|---|---|
| 1 | 1 | −13.40 | 3.34 |
| 2 | 5 | 9.77 | 4.72 |
| 3 | 11 | 19.63 | 1.50 |

Single-lens Data

| Lens | Starting Surface | Focal Length |
|---|---|---|
| 1 | 1 | −8.19 |
| 2 | 3 | 21.22 |
| 3 | 5 | 8.66 |
| 4 | 7 | 4.37 |
| 5 | 8 | −3.24 |
| 6 | 11 | 19.63 |

NUMERICAL EXAMPLE 4

Unit: mm

Surface Data

| Surface Number | r | d | nd | vd |
|---|---|---|---|---|
| 1* | −48.511 | 0.70 | 1.88202 | 37.2 |
| 2* | 8.016 | 0.98 | | |
| 3 | 10.412 | 1.45 | 2.14352 | 17.8 |
| 4 | 18.940 | (d4) | | |
| 5* | 6.663 | 1.26 | 1.85135 | 40.1 |
| 6* | −480.964 | 0.10 | | |
| 7* | 6.245 | 1.30 | 1.85135 | 40.1 |
| 8 | −29.629 | 0.40 | 1.84666 | 23.8 |
| 9 | 3.771 | 1.05 | | |
| 10(Stop) | ∞ | (d10) | | |
| 11* | 45.533 | 1.25 | 1.88202 | 37.2 |
| 12* | −28.426 | (d12) | | |
| 13 | ∞ | 1.20 | 1.51633 | 64.1 |
| 14 | ∞ | 0.78 | | |
| Image Plane | ∞ | | | |

Aspheric Surface Data

First Surface

K = 0.00000e+000   A4 = 1.42472e−004   A6 = 5.97863e−006
A8 = −2.37081e−007   A10 = 3.47991e−009   A12 = −2.25759e−011

Second Surface

K = −7.03070e−001   A4 = 1.89888e−004   A6 = 2.35345e−005
A8 = −1.02266e−006   A10 = 3.01242e−008   A12 = −4.31911e−010

Fifth Surface

K = 7.46357e−001   A4 = −6.34087e−004   A6 = 5.47762e−005
A8 = −1.04910e−005   A10 = −8.70046e−008

Sixth Surface

K = 2.09038e+004   A4 = −1.38720e−004   A6 = −2.32421e−005
A8 = −4.01514e−006

Seventh Surface

K = −1.11610e+000   A4 = 2.89608e−004   A6 = −1.16973e−004
A8 = 9.31385e−006

Eleventh Surface

K = −4.17513e+002   A4 = 2.54230e−004   A6 = −2.03919e−005
A8 = 2.16527e−007

Twelfth Surface

K = 4.15534e+000   A4 = −9.99102e−005   A6 = −4.64186e−006
A8 = −5.65051e−008

Various Data
Zoom Ratio 5.39

| Focal Length | 5.16 | 10.83 | 27.83 |
|---|---|---|---|
| F-number | 3.50 | 5.50 | 7.10 |
| Half Angle of View | 32.18 | 19.69 | 7.93 |
| Image Height | 3.25 | 3.88 | 3.88 |
| Total Lens Length | 33.86 | 28.80 | 38.06 |
| BF | 0.78 | 0.78 | 0.78 |
| d4 | 16.71 | 6.38 | 0.61 |
| d10 | 3.94 | 9.41 | 24.99 |
| d12 | 2.75 | 2.54 | 2.00 |

Zoom Lens Unit Data

| Unit | Starting Surface | Focal Length | Lens Configuration Length |
|---|---|---|---|
| 1 | 1 | −13.67 | 3.13 |
| 2 | 5 | 9.79 | 4.11 |
| 3 | 11 | 20.00 | 1.25 |

Single-lens Data

| Lens | Starting Surface | Focal Length |
|---|---|---|
| 1 | 1 | −7.75 |
| 2 | 3 | 18.54 |
| 3 | 5 | 7.73 |
| 4 | 7 | 6.16 |
| 5 | 8 | −3.93 |
| 6 | 11 | 20.00 |

TABLE 1

| | Condition Range | | Example | | | |
|---|---|---|---|---|---|---|
| Condition | Upper Limit | Lower Limit | 1 | 2 | 3 | 4 |
| (1) f2/fT | 0.100 | 0.425 | 0.416 | 0.357 | 0.326 | 0.352 |
| (2) Npave | 1.75 | 2.50 | 1.762 | 1.772 | 1.812 | 1.932 |
| (3) f3/ft | 0.5 | 1.0 | 0.829 | 0.721 | 0.654 | 0.719 |
| (4) \|f1/f3\| | 0.3 | 0.7 | 0.674 | 0.657 | 0.683 | 0.684 |
| (5) β2t/β2w | 4.55 | 8.00 | 4.591 | 5.199 | 5.581 | 5.145 |
| (6) \|fpave/fnave\| | 1.0 | 2.6 | 2.442 | 2.573 | 2.355 | 2.243 |
| (7) vpave | 30 | 45 | 44.8 | 44.8 | 42.6 | 33.8 |
| (8) R2c/fT | −1.10 | −0.05 | −0.206 | −0.188 | −0.191 | −1.065 |

Next, an exemplary embodiment of a digital camera (optical device), in which the zoom lens according to the exemplary embodiment is used as a photographic optical system, will be described with reference to FIG. 9. In FIG. 9, the digital camera includes a digital camera body 20, a photographic optical system 21 configured by the zoom lens described in each exemplary embodiment, and an image sensor 22, such as a CCD sensor, configured to optically receive an object image formed by the photographic optical system 21. A recording unit 23 is configured to record the object image received by the image sensor 22, and a viewfinder 24 allows a user to observe the object image displayed on a display device (not illustrated).

The display device includes a liquid crystal panel and displays the object image formed on the image sensor 22. Also, the zoom lens according to each exemplary embodiment of the present invention can also be applied to a mirror-less digital single-lens reflex camera having no quick-return mirror. By applying the zoom lens according to each exemplary embodiment of the present invention to the optical devices, such as digital cameras, the present invention realizes small-size optical devices having high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-016351 filed Jan. 30, 2012, which is hereby incorporated by reference herein in its entirety.

What is claimed is:

1. A zoom lens comprising, in order from an object side to an image side:
a first lens unit having negative refractive power;
a second lens unit having positive refractive power; and
a third lens unit having positive refractive power,
wherein a distance between every adjacent ones of the first to third lens units varies during zooming,
wherein the second lens unit includes, in order from the object side to the image side, a positive lens and a cemented lens in which a positive lens and a negative lens are cemented, and
wherein the following conditions are satisfied:

$$0.100 < f2/fT < 0.425$$

$$1.75 < Npave < 2.50$$

$$0.5 < f3/fT < 0.9$$

where f2 is a focal length of the second lens unit, f3 is a focal length of the third lens unit, fT is a focal length of the entire zoom lens at a telephoto end, and Npave is an average refractive index of materials of the positive lenses included in the entire zoom lens.

2. The zoom lens according to claim 1, wherein the following condition is satisfied:

$$0.3 < |f1/f3| < 0.7$$

where f1 is a focal length of the first lens unit.

3. The zoom lens according to claim 1, wherein the following condition is satisfied:

$$4.55 < \beta 2t/\beta 2w < 8.00$$

where β2w is an imaging magnification of the second lens unit at a wide-angle end, and β2t is an imaging magnification of the second lens unit at the telephoto end.

4. The zoom lens according to claim 1, wherein the following condition is satisfied:

$$1.0 < |fpave/fnave| < 2.6$$

where fpave is an average value of focal lengths of all positive lenses included in the entire zoom lens, and fnave is an average value of focal lengths of all negative lenses included in the entire zoom lens.

5. The zoom lens according to claim 1, wherein the following condition is satisfied:

$$30 < vpave < 45$$

where vpave is an average value of Abbe numbers of materials of all positive lenses included in the entire zoom lens.

6. The zoom lens according to claim 1, wherein the following condition is satisfied:

$$-1.10 < R2c/fT < -0.05$$

where R2c is a radius of curvature of a cemented lens surface of the cemented lens of the second lens unit.

7. The zoom lens according to claim 1, wherein the first lens unit includes, in order from the object side to the image side, a negative lens and a positive lens.

8. The zoom lens according to claim 1, wherein the third lens unit includes a single positive lens.

9. An image pickup apparatus comprising:
a zoom lens; and
an image sensor configured to receive an image formed by the zoom lens,
wherein the zoom lens comprises, in order from an object side to an image side:
a first lens unit having negative refractive power;
a second lens unit having positive refractive power; and
a third lens unit having positive refractive power,
wherein a distance between every adjacent ones of the first to third lens units varies during zooming,
wherein the second lens unit includes, in order from the object side to the image side, a positive lens and a cemented lens in which a positive lens and a negative lens are cemented, and
wherein the following conditions are satisfied:

$$0.100 < f2/fT < 0.425$$

$$1.75 < Npave < 2.50$$

$$0.5 < f3/fT < 0.9$$

where f2 is a focal length of the second lens unit, f3 is a focal length of the third lens unit, fT is a focal length of the entire zoom lens at a telephoto end, and Npave is an average refractive index of materials of the positive lenses included in the entire zoom lens.

* * * * *